(12) United States Patent
Singleton et al.

(10) Patent No.: US 11,573,141 B2
(45) Date of Patent: Feb. 7, 2023

(54) THRESHOLD SENSOR WITH RFID COMMUNICATION ABILITY

(71) Applicant: SMARTRAC INVESTMENT B.V., Amsterdam (NL)

(72) Inventors: Laurence Singleton, Dresden (DE); Alex Boellaard, Emst (NL); Ray Freeman, Mesa, AZ (US); Henry Prescher, Dresden (DE); Patrick Mende, Leipzig (DE)

(73) Assignee: SMARTRAC INVESTMENT B.V., Oegstgeest (NL)

( * ) Notice: Subject to any disclaimer, the term of this patent is extended or adjusted under 35 U.S.C. 154(b) by 0 days.

(21) Appl. No.: 17/513,191

(22) Filed: Oct. 28, 2021

(65) Prior Publication Data

US 2022/0196500 A1     Jun. 23, 2022

Related U.S. Application Data

(63) Continuation of application No. 16/641,341, filed as application No. PCT/EP2018/072667 on Aug. 22, 2018, now abandoned.

(30) Foreign Application Priority Data

Aug. 25, 2017   (EP) .................................. 17187963
Dec. 14, 2017   (EP) .................................. 17207384

(51) Int. Cl.
*G01L 9/00*      (2006.01)
*G01L 11/00*     (2006.01)
*G01L 13/02*     (2006.01)

(52) U.S. Cl.
CPC .......... *G01L 9/0027* (2013.01); *G01L 11/002* (2013.01); *G01L 13/02* (2013.01)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047;

(Continued)

(56) References Cited

U.S. PATENT DOCUMENTS

| | | | |
|---|---|---|---|
| 7,383,737 B1* | 6/2008 | Lin | G01L 9/0072 73/718 |
| 2017/0167932 A1* | 6/2017 | Donskoy | G01M 5/0041 |
| 2021/0215562 A1* | 7/2021 | Boellaard | G01L 19/12 |

* cited by examiner

*Primary Examiner* — Andre J Allen
(74) *Attorney, Agent, or Firm* — Quarles & Brady LLP

(57) ABSTRACT

A motor casing and a combination of a motor casing and a plug connection, the motor casing being designed for a drive of movable components of a vehicle, in particular sunroofs, blinds or roofs of convertible. A plug is inserted in the motor casing and a gap is provided between the motor casing and the plug connection. According to the disclosure, at least one projection is provided in the area of the gap and avoids play between the motor casing and the plug connection.

15 Claims, 8 Drawing Sheets

Figure 1:
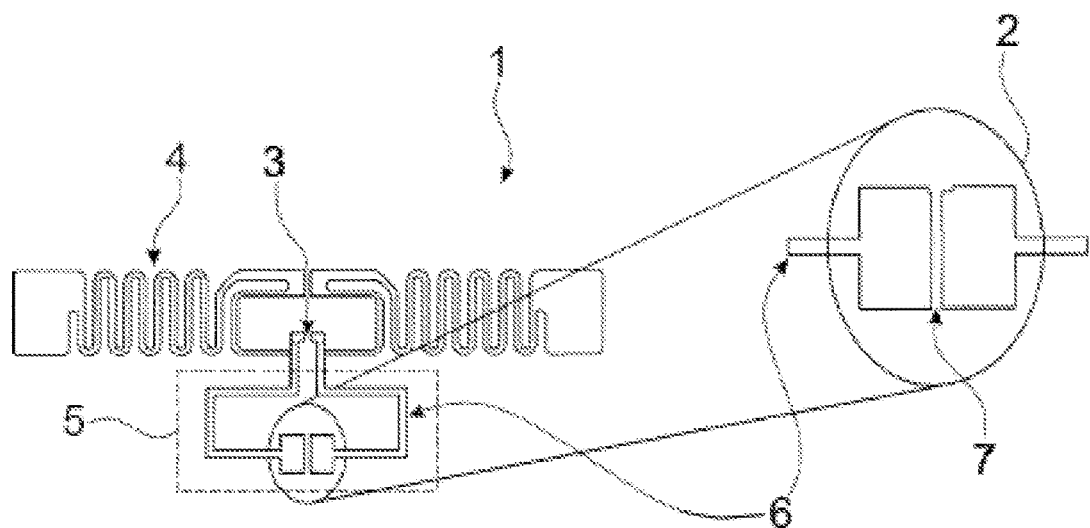

(58) Field of Classification Search
CPC ... G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16
USPC .................................................. 73/700–756
See application file for complete search history.

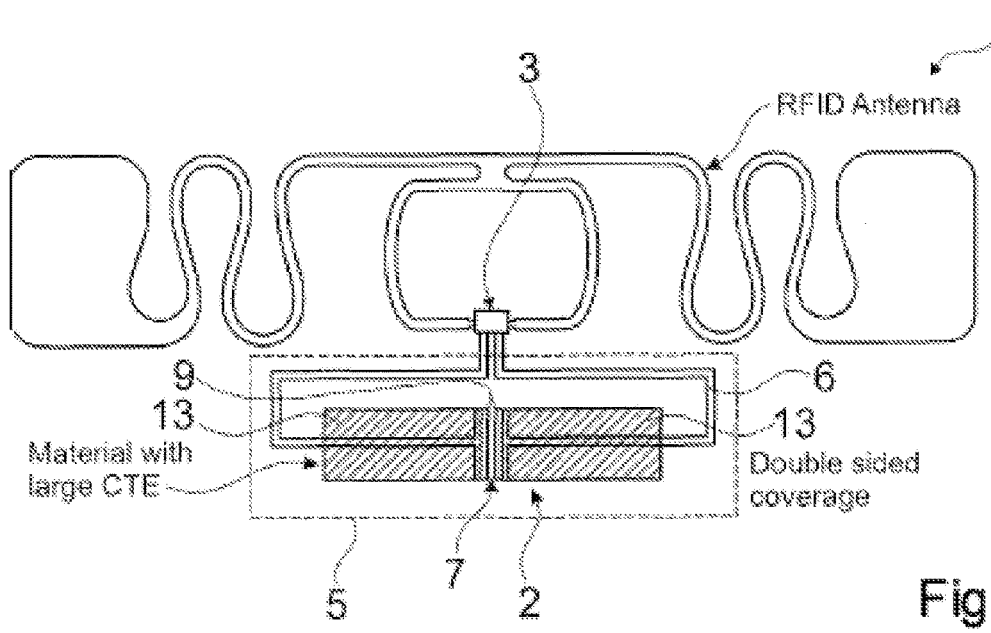
Fig. 8A
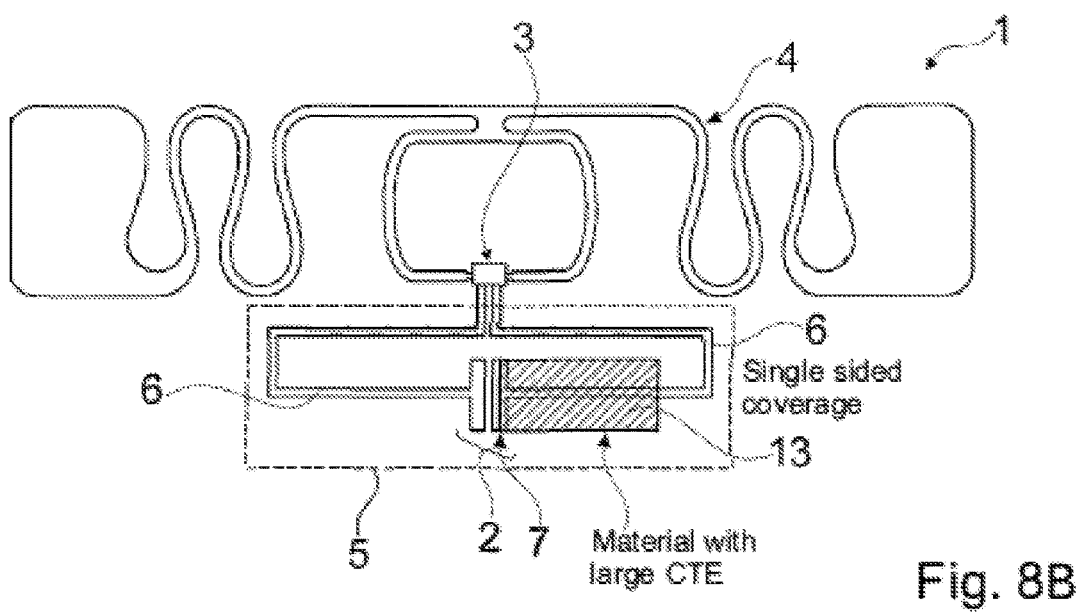
Fig. 8B
Table 1. CTE vs. dn/dT for materials with different substituents on the siloxane polymer backbone.
| Sample | Linear CTE, ppm/°C | dn/dT, °C⁻¹ | |
|---|---|---|---|
| | | bulk | thin film |
| Dimethylsiloxane | 325 | $-5 \times 10^{-4}$ | $-3.6 \times 10^{-4}$ |
| Dimethyl-methylphenyl-siloxane | 265 | $-4.4 \times 10^{-4}$ | $-3.3 \times 10^{-4}$ |
| LinearCTE, ppm/°C | 250 | $-3.8 \times 10^{-4}$ | $-3.0 \times 10^{-4}$ |
| Phenyl-T resin (below & above $T_g$) | 179 / 221 | In progress | $-2.1 \times 10^{-4}$ / $-2.6 \times 10^{-4}$ |
Fig. 9

THRESHOLD SENSOR WITH RFID COMMUNICATION ABILITY

CROSS-REFERENCE TO RELATED APPLICATIONS

This application is a continuation of U.S. patent application Ser. No. 16/641,341 filed Feb. 24, 2020, which represents the national stage entry of PCT International Patent Application No. PCT/EP2018/072267 filed Aug. 22, 2018, which claims priority to European Patent Application 17187963.8 filed Aug. 25, 2017, and European Patent Application 17207384.3 filed Dec. 14, 2017. The contents of these applications are hereby incorporated by reference as if set forth in their entirety herein.

The disclosure relates to a threshold sensor sensing a threshold resistance value by a physical property, whereas the sensor has RFID communication ability.

In the broadest definition, a sensor is an electronic component, module, or subsystem whose purpose is to detect events or changes in its environment and send the information to other electronics, frequently a computer processor. A sensor is always used with other electronics, whether as simple as a light or as complex as a computer.

Most of the communication with sensors based on the wired connections between sensor and a processing unit, which is needed to further processes the sensor data.

The disadvantages of that prior art are the wired connections and no threshold change is recorded by the sensor device itself. Furthermore, the implementation of recording features inside sensor devices requires the use of microcontroller and energy sources, increasing both complexity and cost.

Depending on the sensor principle threshold changes are detected more or less through changes in resonant frequency or through changes of capacitive value.

There are many different sensors for detecting various physical properties that are based on different sensor principles.

One example is the detection of temperature. The detection of temperature can provide a fulfillment of requirements check during transport, that for example foodstuffs or vital substances have not exceeded a specific temperature threshold, which would otherwise mean damage. In this case, a single state temperature monitor is required, i.e. reached threshold or not. However, in some cases a dynamic temperature monitor is also required, where the temperature indicator turns on when the threshold is exceeded, but then turns off again when the temperature goes below a specific threshold.

Another example is the detection of moisture. The detection of moisture can provide a good indication of the requirement to check for leaks or moisture ingress. In places that are difficult to access, it is difficult however to assess the amount of moisture that has accumulated by visual inspection.

And another example is the detection of dust. The detection of dust is usually performed by filters and a differential pressure transmitter that is used for the continuous measurement of pressure differences in dusts and also in liquids, vapors and gases. For example, from the differential pressure, the hydrostatic fill level in a vessel or the mass flow through a pipe can be calculated. Also, the saturation of a particulate filter can be determined by measuring the differential pressure before and after the particulate filter.

In order to monitor the optimum functioning of a filter differential pressure measurement, so-called mechanical filter minders have been used which mechanically keep track of the pressure differential over a filter. The disadvantages of the mechanical filter minders are on the one hand a required visual inspection and on the other hand that these minders have to be installed separate from the filter and may require additional work to fit the air box. For example, the filter minder is attached directly to the air induction system of a car or a truck motor. This may require modification of the induction system to accommodate the filter minder.

For filter differential pressure measurement also an engine MAP (manifold absolute pressure) sensor can be used. But this measurement setup requires a MAP sensor to be available as well as separate electronics for processing the pressure data and additional wiring to the MAP sensor, vehicle electronic control unit (ECU) or on board diagnostic tools (OBD) are required.

The purpose of the disclosure is to overcome the disadvantages by providing a means to sense and record a specified threshold resistance value by a physical property to be crossed with the additional ability to communicate this without the requirement of a local energy source and a wired connection. No direct access or visual inspection of the sensing element should be required.

Another purpose of the disclosure is to solve the problem how the accumulation of moisture reaching a certain threshold can be signaled in a cost effective, unobtrusive and contactless way as well as the problem how a specific temperature threshold can be reliably detected.

Summarizing, the general objective of the disclosure is to provide a sensor that can reliably and accurately detect a trigger point or threshold value, whereas the detection can be reliable and wireless forwarded to a processing unit for further processing.

The objective of the disclosure will be solved by a threshold sensor comprising a sensing element sensing a threshold resistance value by a physical property and a RFID tag comprising a tag antenna, a tag integrated circuit and a tamper loop connecting the sensing element with the tag IC and tracking the physical property to the tag IC, whereas the sensing element is part of the tamper loop and triggers the tag IC if the threshold resistance value by the physical property has been reached.

The RFID tag in the meaning of this disclosure is the generic term or summary of the features tag antenna, the tag integrated circuit and the tamper loop connecting the sensing element with the tag IC. The sensing element is connected to the tag IC over the tamper loop.

The sensing element detects a physical property, whereas the tamper loop triggers the tag IC if a pre-defined threshold resistance value of the sensing element has been reached. The tag IC will change a tamper bit and this can be read by reading the RFID tag with a RFID reader for further processing. The tracking of a physical property in the sense of the present disclosure should be understood as a monitoring or tracing of the physical property if a pre-defined threshold has already been reached or not.

In a preferred embodiment of the disclosure the physical property is dust or temperature or moisture. Due to a physical property, like the existence of dust/dirt or a temperature or moisture in the environment of the sensing element, the tag IC is triggered over the tamper loop if a pre-defined threshold resistance value is reached. For example, this threshold resistance value can be reached if a specific amount of dust has been lain down on the sensing element or a temperature level has been exceeded or fallen below or an amount of moisture has been adsorbed on the sensing element.

In a very preferred embodiment of the disclosure the sensing element comprises a conductive trace with a gap structure in it, whereas the gap structure separates the conductive trace into two parts, and whereas the gap structure has a gap length and a gap width. The conductive trace as part of the sensing element and the tamper loop is divided by the gap into two parts. The two parts can be seen as two electrodes connected to the RFID tag IC. Hence, the RFID tag uses an IC that has a so called tamper loop feature. The tamper loop is a track or trace on the RFID tag connected to the IC and should be understood as a tamper-proof means. For example, the tag IC can detect if the tamper loop is closed (low resistance) or open (high resistance). The sensing element can be seen as a kind of a resistance sensitive structure that is part of the tamper loop, for example metallic structure with a gap. With no dust or dirt on the resistance sensitive structure the resistance of that structure essentially is infinite. With the accumulation of dust/dirt on the structure, specifically on the gap, the resistance value changes. At a certain threshold of accumulation, the resistance of the structure will go below the value that the tag IC uses to indicate an open loop, so the status of the loop changes from open to close. The IC will then change a tamper bit and this can be read by reading the RFID tag with a RFID reader for further processing.

The gap in the conductive trace is sufficient to establish a high resistance or non-conductivity of the sensing element. If a temperature as the physical property is used in order to detect a change in the environment of the sensing element an auxiliary sensing medium is necessary. For example, a temperature sensitive material is applied by a printing or dispensing process across the gap, connecting the conductive trace on either side of the gap physically. This temperature sensitive material only sufficiently hardens and becomes conductive once a specific temperature value has been reached.

The conductive trace with the gap in it can also be seen as an internal resistive digital switch, whereas the sensing element is used to measure the presence or absence of moisture. With moisture accumulating in the gap, the resistance across the gap will drop from infinite resistance to some finite low resistance value which depends on the amount of moisture in the gap, but also on the width of the gap. In addition, ions in the moisture will improve the conductivity across the gap width, depending on the concentration level of the conductive ions. Below a certain resistance value, the RFID IC or RFID chip will detect that the resistive digital switch has gone from open to close or 0 to 1, thereby changing the bit level of the status bit in an IC internal register. This change of the status bit in the tag IC register from 0 to 1 can be then read from the RFID tag IC via a read command from the external RFID reader which accesses to appropriate register. In this way, the absence or presence of moisture can be detected.

In a very preferred embodiment of the disclosure the threshold resistance value is adjustable by the gap width and the gap length. The gap width in the meaning of this disclosure is the distance between the two parts or electrodes of the conductive trace that are separated by the gap. The gap length is defined by the length of the edges of the two parts or electrodes of the conductive trace that lay opposite to each other. The gap width and gap length can be varied to accommodate for different threshold resistance values. Gaps in a metallic structure can be made by etching and in case very narrow or very accurate gaps are required, by laser.

In the case dust threshold value or temperature threshold value or moisture threshold value detection, any gap is sufficient, as long as the electrical resistance between the two parts of the conductive trace on either side of the gap is high. For the purpose of this disclosure, the gap width is important, as the material only need to have sufficient conductivity, in order to allow current to flow across the gap. Alternatively, it is also possible that in an initial state the sensing element with the gap structure has a low resistance or is conductive and loses its conductivity if the threshold resistance value is reached.

In another embodiment of the disclosure the gap structure has a comb or finger structure for extending the gap length. Gap lengths can be maximized by using so called fingers or other geometric structures. This has the purpose to increase the sensor surface and the size of the sensing element.

In a further embodiment of the disclosure the conductive trace as part of the tamper loop is folded along a line perpendicular to the gap structure. Folding along a perpendicular line has the advantage that the gap width will not vary with folding angle. In order to assist the accumulation of dust/dirt on the tamper loop track, the tag is folded along a line perpendicular to that gap. Dust/dirt will accumulate faster and more reliably in the fold than on a flat surface and this helps to get consistent threshold results.

In a further embodiment of the disclosure the conductive trace as part of the tamper loop is folded along a line parallel to the gap structure. Folding along the parallel line has the advantage that for example the amount of dust/dirt on the gap increases. By folding the tamper loop in the area of the sensing element dust/dirt will accumulate faster and more reliably in the fold than on a flat surface and this helps to get consistent threshold results. With this advantageous embodiment also the accumulation of moisture on the gap zone can be assist, whereas the tag is folded along a line parallel to that gap. Moisture will accumulate faster and more reliably in the fold than on a flat surface and this may help to get consistent threshold results.

In another embodiment of the disclosure air holes are placed in the gap structure or close to the gap structure in order to accumulate dust between the two parts of the conductive trace of the sensing element. If using essentially flat materials for the sensor structure, air cannot flow through the tag or sensor structure itself. This means that when the air flow is high, dust does not accumulate on the sensor structure surface, but is blown off. To help dust to accumulate on the sensor structure, air holes can be cut in strategic locations of the tag of the sensing element. Strategic locations can be in the gap structure and/or close to it.

In a further embodiment of the disclosure the two parts of the conductive trace of the sensing element are connected physically by a sensing material over the gap structure. The sensing material can be manipulated by a physical property in the environment of the sensing element, for example a temperature or moisture. The interacting of the sensing material with temperature changes across a threshold or the detection of moisture will change the state of the sensing material and hence the sensing element.

So, in an embodiment of the disclosure the sensing material is a temperature sensitive material comprising conductive particles, whereas the temperature sensitive material changes its conductive state according to a temperature threshold. If a temperature as a physical property is used in order to detect a change in the environment of the sensing element the temperature sensitive material is applied by a printing or dispensing process across the gap, connecting the conductive trace or electrodes on either side of the gap physically. This temperature sensitive material only sufficiently hardens and becomes conductive once a specific temperature has been reached. In an initial state, the temperature sensitive material has a high resistance, and the bit level of the status bit in the tag IC's internal register, which reflects the state of the digital resistive switch, hence the sensing element, is set to 0. As the temperatures reaches or is above the threshold temperature, the temperature sensitive material changes its state and the resistance changes from high resistance to low resistance. As a result, the bit level of the status bit in the tag IC's internal register, reflecting the state of the temperature sensitive material of the digital resistive switch, is set to 1. In this way, that the surroundings changed their temperature above a specific temperature can be detected.

In another embodiment of the disclosure the sensing material is a moisture sensitive material comprising conductive and/or soluble particles, whereas the moisture sensitive material changes its conductive state according to a moisture threshold. Moisture may simply modify the state of a moisture sensitive material on the applied gap. The moisture sensitive material can be an absorbing material which can absorb moisture. This material may be a conductive paste, which only hardens and becomes conductive in the presence of moisture. In the initial state, the material is non-conductive and has a high resistance, and the digital resistive switch is set to 0. As a result of the absorption of moisture a chemical reaction starts in the material, leading to a reduction in volume. The conductive particles then compress to each other in the material to yield a higher conductivity, i.e. a lower resistance in final state post chemical reaction compared to original state, i.e. the digital resistive switch is set to 1. It is also possible that in the presence of moisture the particles dissolves in the mixture and the material become conductive as well.

Alternatively, the material may have a low resistance when it is placed on the gap area, but as a result of moisture ingress, loses their conductivity in its final state. So, the absorbing material can be also a material with soluble particles and be conductive in the case that no moisture is present. Due to moisture ingress, the conductive particles corrode, and lose their conductivity. With the conductivity loss, the resistance becomes high, i.e. the digital resistive switch is set to 0.

In another embodiment of the inventive threshold sensor only one or both of the two parts of the conductive trace of the sensing element are covered by a temperature sensitive material, whereas the gap structure remains uncovered, and whereas the temperature sensitive material has a high coefficient of thermal expansion relative to the thermal expansion of a subtract material carrying the threshold sensor. This alternative embodiment utilizes differences in the thermal expansion coefficient between materials to indicate that a specific temperature threshold has been reached. The sensing element comprises a conductive trace with a gap in it, where the gap has been generated preferably by a laser processing method, in order to generate a gap structure of very small width compared to the dimensions of the conductive trace. In this case, the two conductor structures of the sensing element on either side of the gap are very close to each other, but remain electrically isolated, i.e. the resistance threshold is very high. In this initial state, the bit level of the status bit in the IC internal register, which reflects the state of the digital resistive switch or sensing element, is set to 0. A temperature sensitive material is printed onto the sensing element, either on both sides of the gap structure, covering both the conductor structures and the substrate material under the conductive traces, or the material is coated only on one side, covering as said both the conductor structure and the substrate material under the conductor structure. In both cases, the gap area is free of material, i.e. this area of the sensing element is not covered by material. The material can be printed onto the sensing element, but it can also be brought onto the structure by dispensing. A specific property of this temperature sensitive material is that it has a very high coefficient of thermal expansion relative to the thermal expansion coefficient of the substrate material. For example, the substrate material can be PET (Polyethylenterephthalat), which has a temperature expansion coefficient of $7\times10^{-5}$/K. Therefore a suitable material which can be printed onto the sensing element and which has a higher temperature expansion coefficient would be for example a silicone material, which has a coefficient of thermal expansion $3.25\times10^{-4}$/K, which is a tenfold increase compared to PET. With suitable silicone materials and appropriate locations around the gap structure in the sensing element, the increased expansion of the silicone material compared to the PET, will result in the narrow gap structure being closed and the resistance level dropping from high to low as the conductive trace structures are no longer isolated but touch each other, i.e. the gap is closed. In this state, the bit level of the status bit in the tag IC's internal register, which reflects the state of the digital resistive switch, hence the sensing element, is set to 1. This bit value can be read by the RFID reader system and appropriately noted.

In another embodiment of the inventive threshold sensor, the gap width and the gap length are performable by an etching process or by a laser process or by a combination of the etching and the laser process. Using a laser process it is possible to realize very small and narrow gap widths and more complex gap structures.

In a further embodiment of the inventive threshold sensor, the threshold sensor comprises more than one sensing element each sensing a different threshold resistance value by a physical property, whereas each sensing element is connected by a tamper loop to a tag IC tracking the physical property to the tag IC, whereas each sensing element has a different gap width of the gap structure to measure different threshold resistance values. So, in a more expanded case, several conductive trace structures of sensing elements with individual gaps, meaning different gap widths, can be employed to determine two or more temperature thresholds, where the measurement is dependent only on the gap width, which is tuned for each specific temperature threshold of interest. In this case, each conductive trace with a gap structure of a specific width is attached to an individual, uniquely identifiable RFID tag IC, and upon reaching the temperature threshold, the resistive digital switch will switch from 0 to 1. This can be done by using separate antenna structures in each case. Alternatively, a singular far field antenna structures can be employed, and each conductive trace/gap/RFID tag IC is connected directly or inductively to the farfield, enabling a more compact, material saving antenna design.

The several conductive trace structures with individual gaps with variable gap widths can also be employed to determine a moisture range, where the measurement is dependent only on the gap width. In this case, each conductive trace with a gap structure of a specific width is attached to an individual, uniquely identifiable RFID tag IC, and upon moisture accumulation, the resistive digital switch will switch from 0 to 1, dependent on correlating moisture level and gap width. This can be obviously be done by using separate antenna structures with individual RFID tag ICs for each gap width. Alternatively, a singular far field antenna structures can be employed, and each conductive trace/gap/

RFID tag IC is connected directly or inductively to the farfield, enabling a more compact, material saving antenna design.

The objective of the disclosure will also be solved by a threshold measuring process using the threshold sensor according to the disclosure, wherein the process comprising the following steps: monitoring a threshold resistance value by a physical property using an activated tag IC of a RFID tag, detecting if a pre-defined threshold resistance value has been reached by an zero or infinite resistance of a tamper loop as part of the RFID tag or detecting if the pre-defined differential pressure threshold has not been reached by an infinite or zero resistance of a tamper loop as part of the RFID tag using a RFID transponder.

The sensing element detects a physical property, whereas the tamper loop triggers the tag IC if a pre-defined threshold resistance value of the sensing element has been reached. The tag IC will change a tamper bit and this can be read by reading the RFID tag with a RFID reader for further processing. For example, this threshold resistance value can be reached if a specific amount of dust has been lain down on the sensing element or a temperature level has been exceeded or fallen below or an amount of moisture has been adsorbed on the sensing element.

If a temperature as the physical property is used in order to detect a change in the environment of the sensing element an auxiliary sensing medium is necessary. For example, a temperature sensitive material is applied by a printing or dispensing process across the gap, connecting the conductive trace on either side of the gap physically. This temperature sensitive material only sufficiently hardens and becomes conductive once a specific temperature value has been reached.

As physical property the presence or absence of moisture can be used. With moisture accumulating in the gap, the resistance across the gap will drop from infinite resistance to some finite low resistance value which depends on the amount of moisture in the gap, but also on the width of the gap. In addition, ions in the moisture will improve the conductivity across the gap width, depending on the concentration level of the conductive ions. Below a certain resistance value, the RFID IC or RFID chip will detect that the resistive digital switch has gone from open to close or 0 to 1, thereby changing the bit level of the status bit in an IC internal register. This change of the status bit in the tag IC register from 0 to 1 can be then read from the RFID tag IC via a read command from the external RFID reader which accesses to appropriate register. In this way, the absence or presence of moisture can be detected.

Also, the presence of dust/dirt can be used as a physical property in the environment of the sensing element. With no dust or dirt on the resistance sensitive structure the resistance of that structure essentially is infinite. With the accumulation of dust/dirt on the structure, specifically on the gap, the resistance value changes. At a certain threshold of accumulation, the resistance of the structure will go below the value that the tag IC uses to indicate an open loop, so the status of the loop changes from open to close. The IC will then change a tamper bit and this can be read by reading the RFID tag with a RFID reader for further processing.

The disclosure will be explained in more detail using exemplary embodiments.

The appended drawings show

Figure 2:
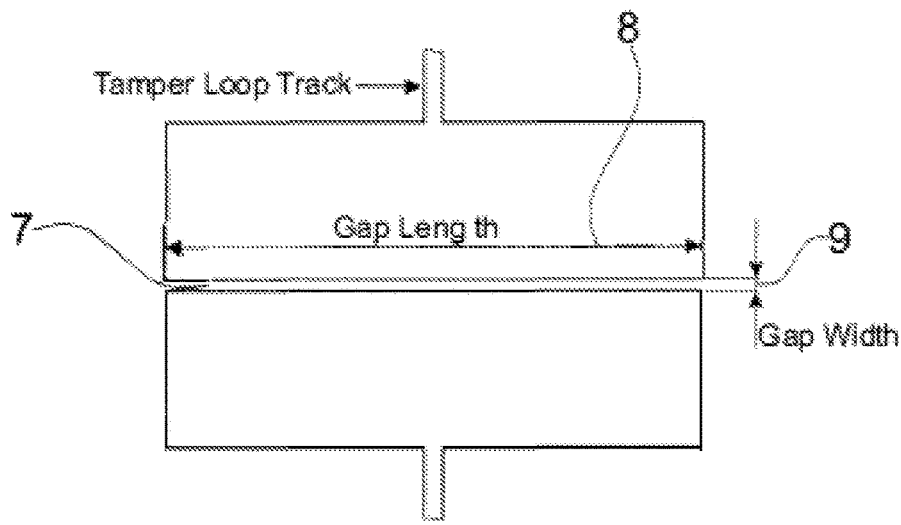
Figure 3:
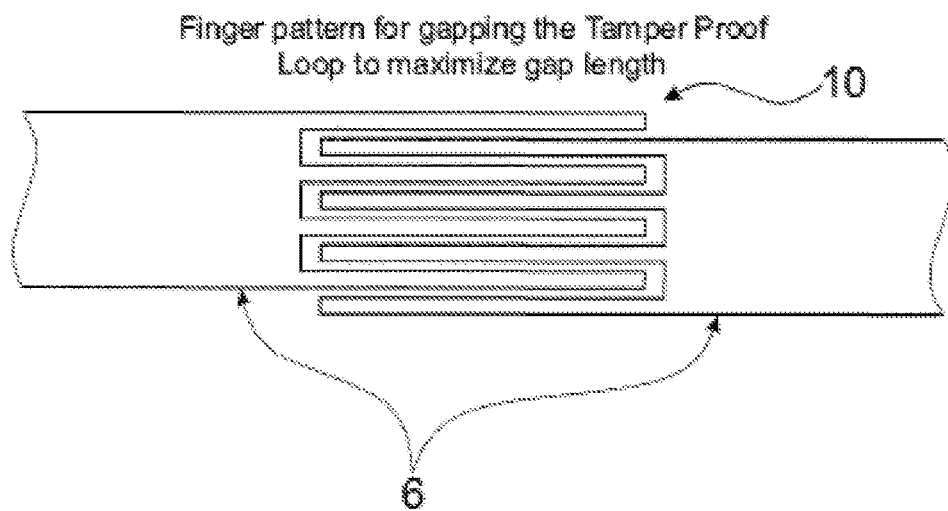
Figure 4:
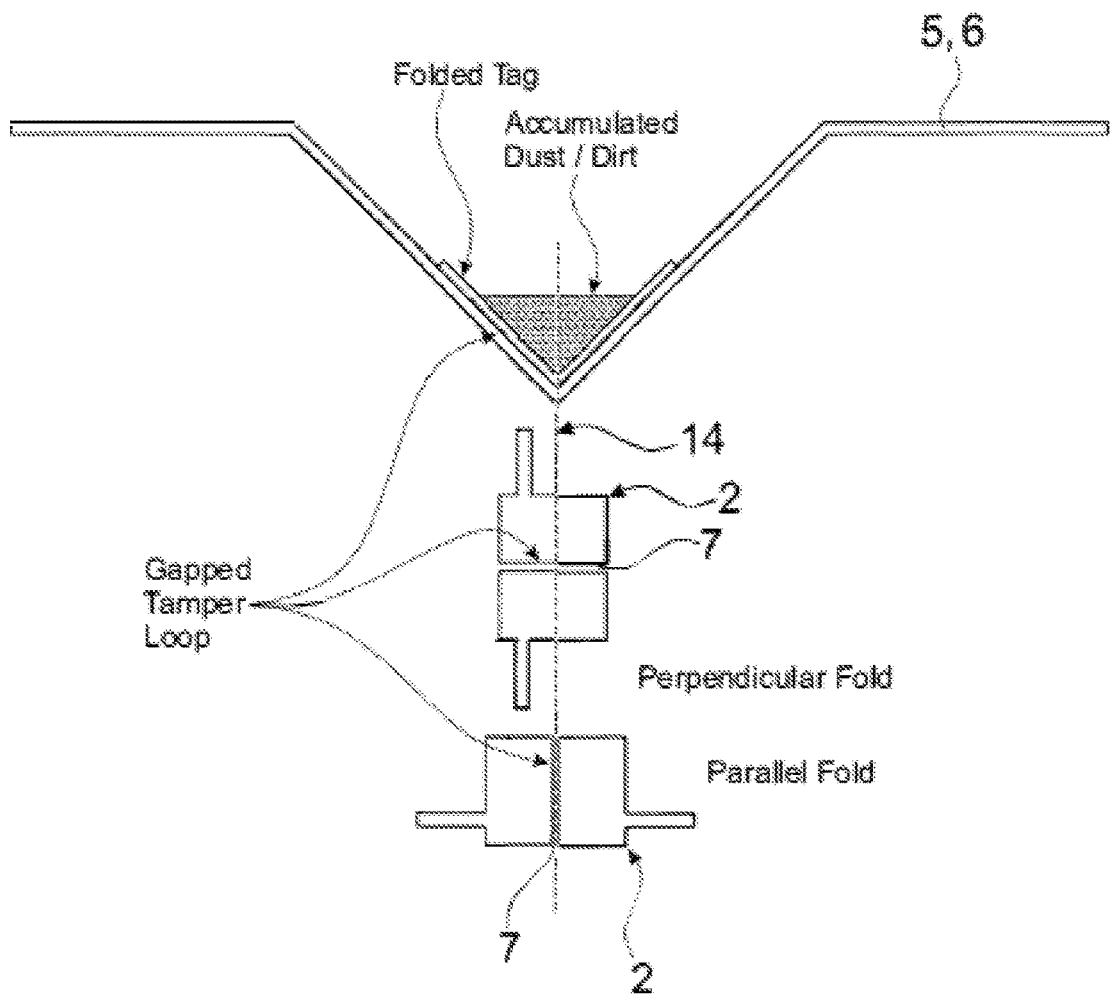
Figure 5:
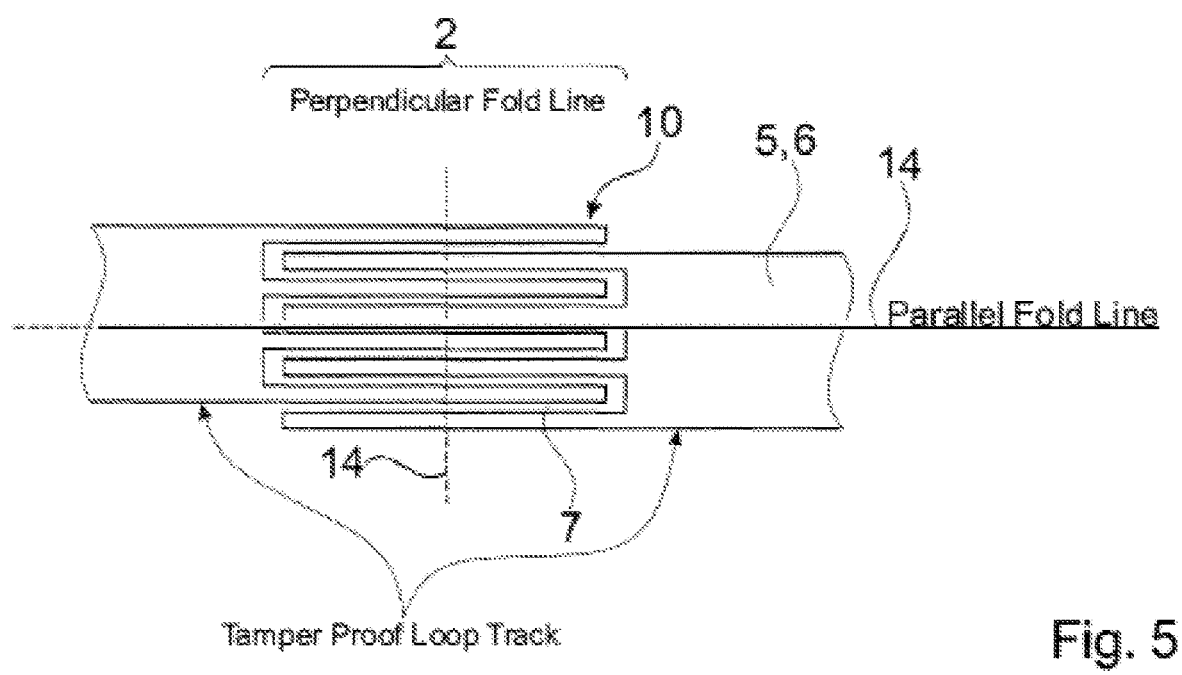
Figure 6:
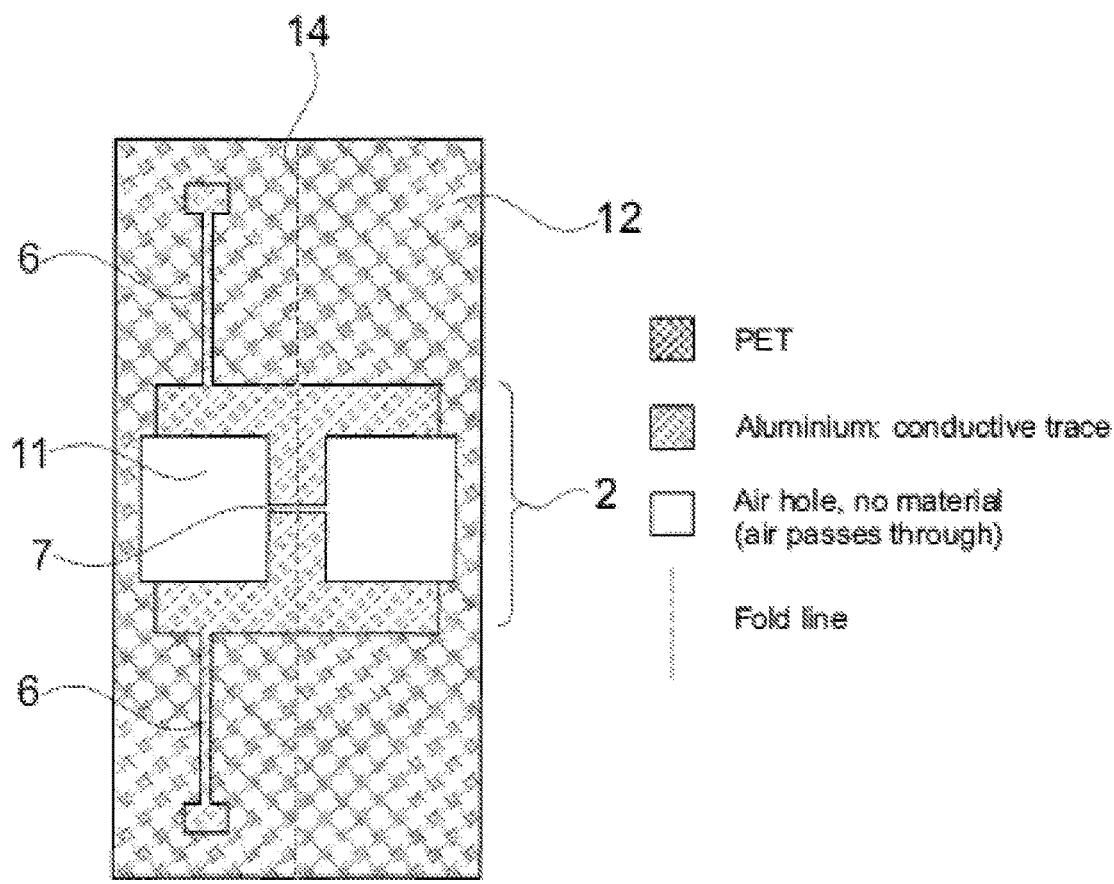
Figure 7:
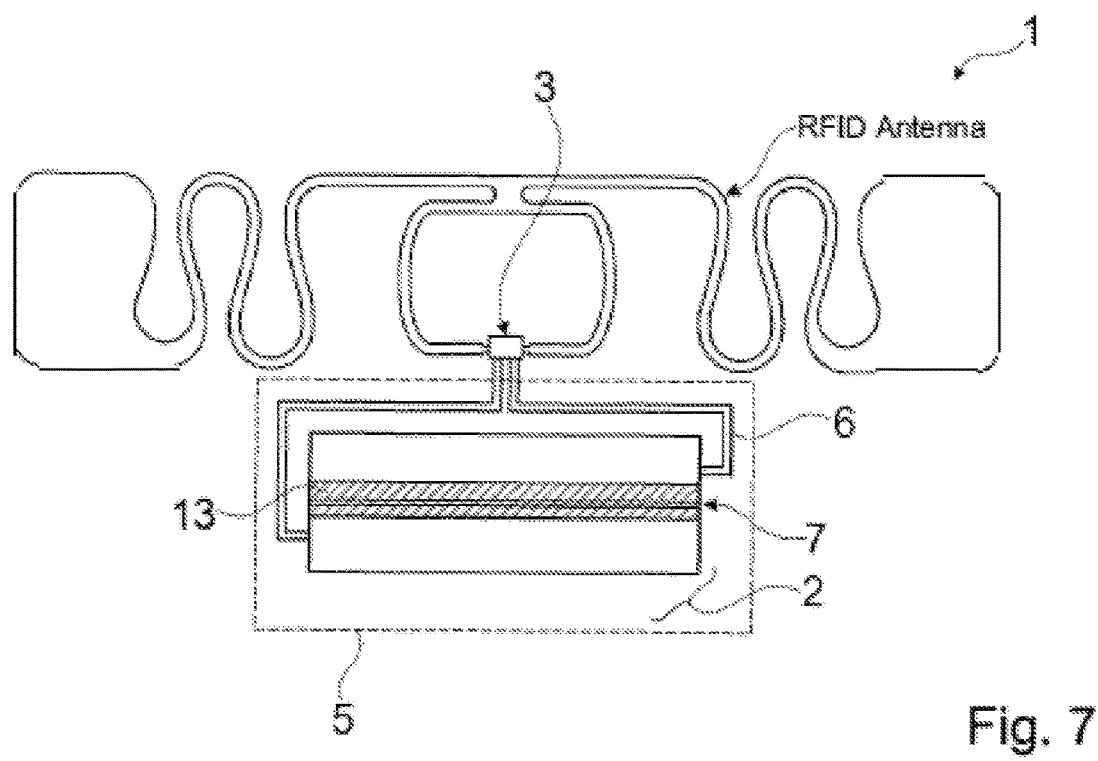
Figure 10:
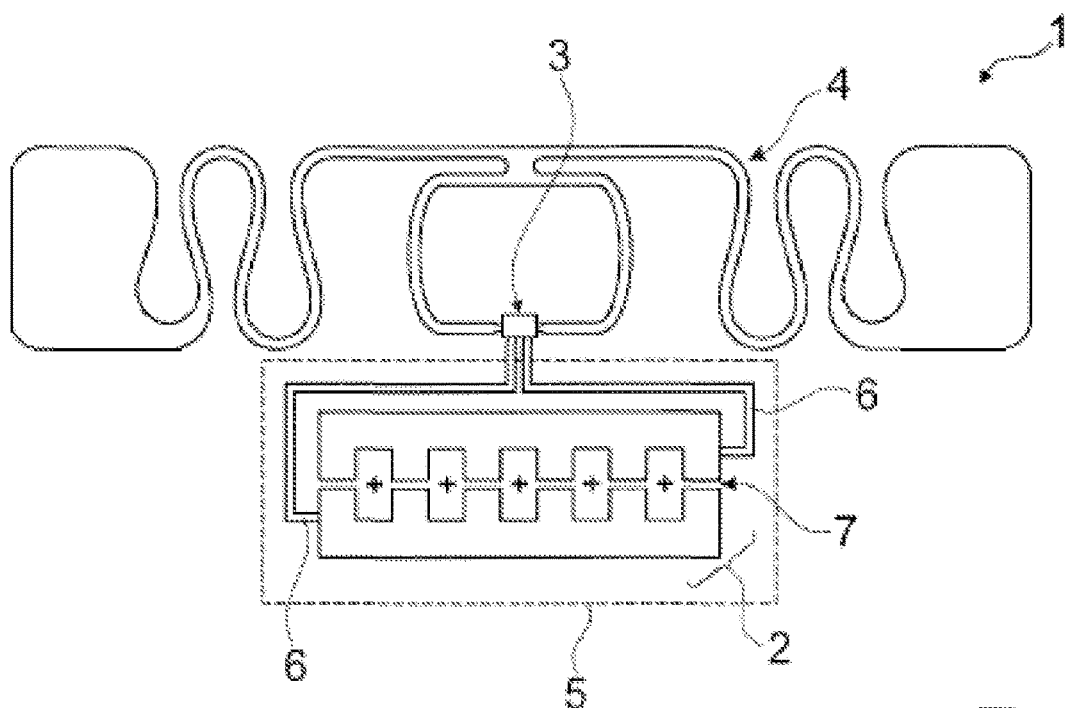
Figure 11:
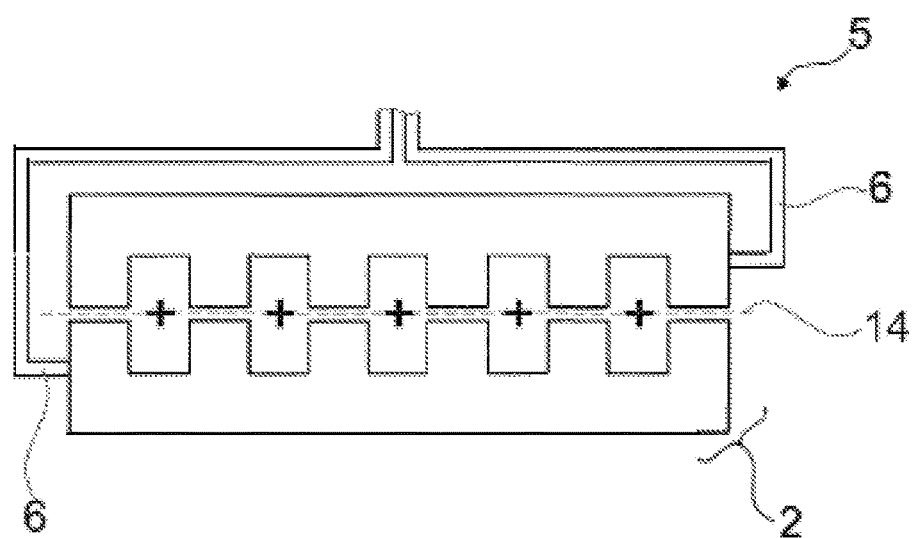
Figure 12:
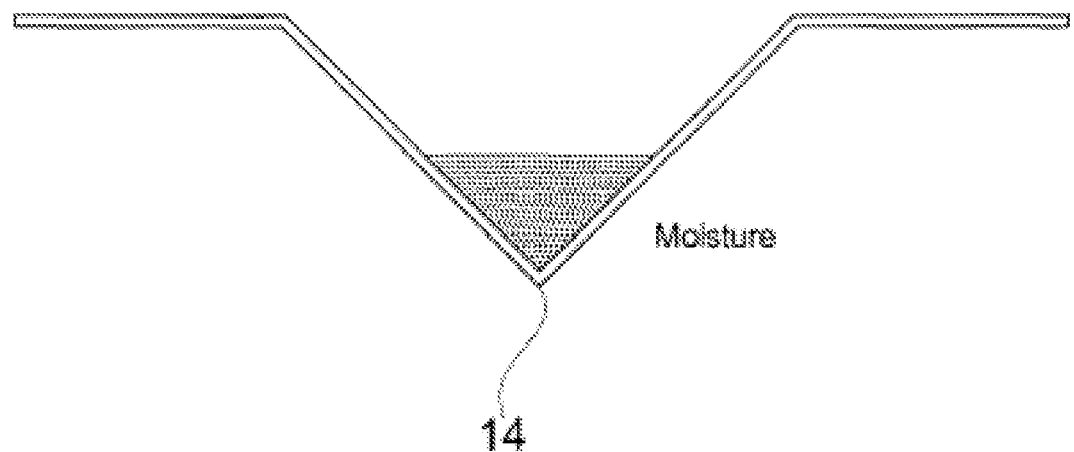
Figure 13:
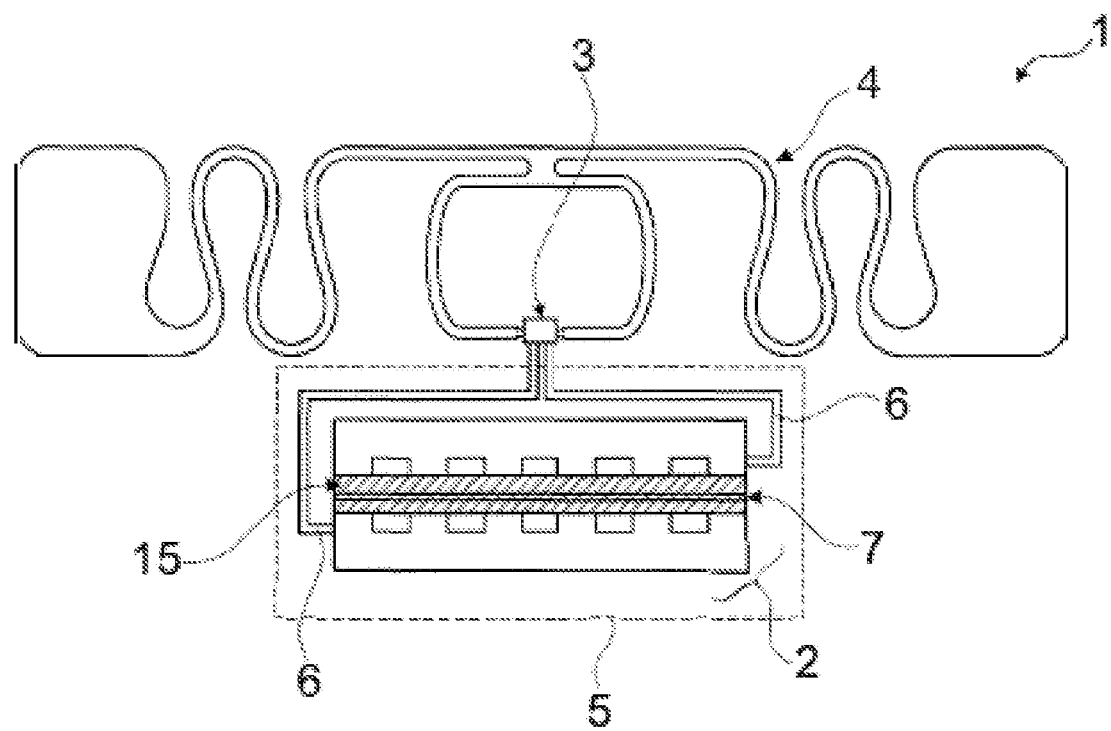
Figure 14A:
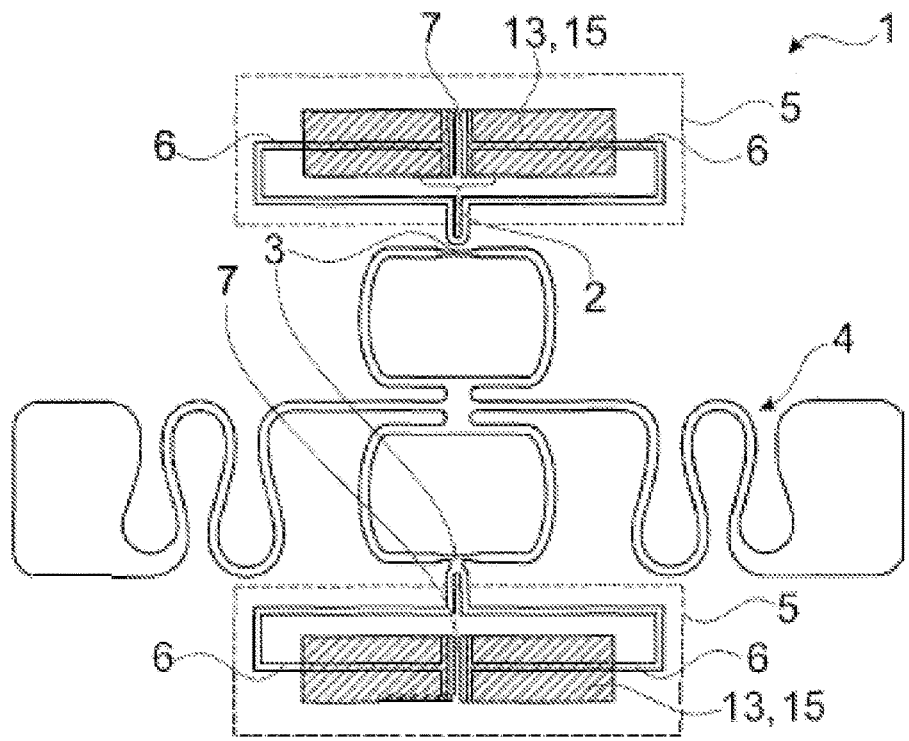
Figure 14B:
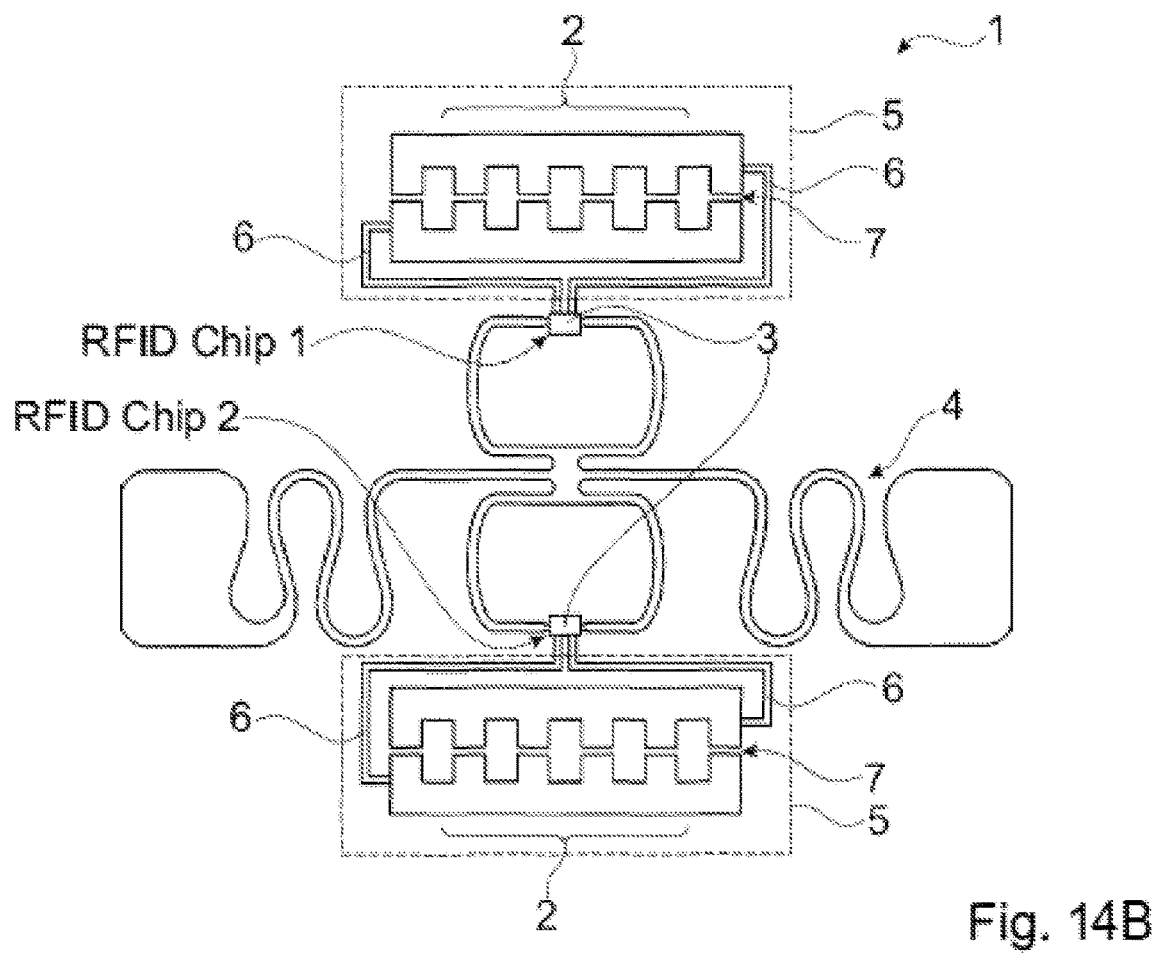
Figure 15A:
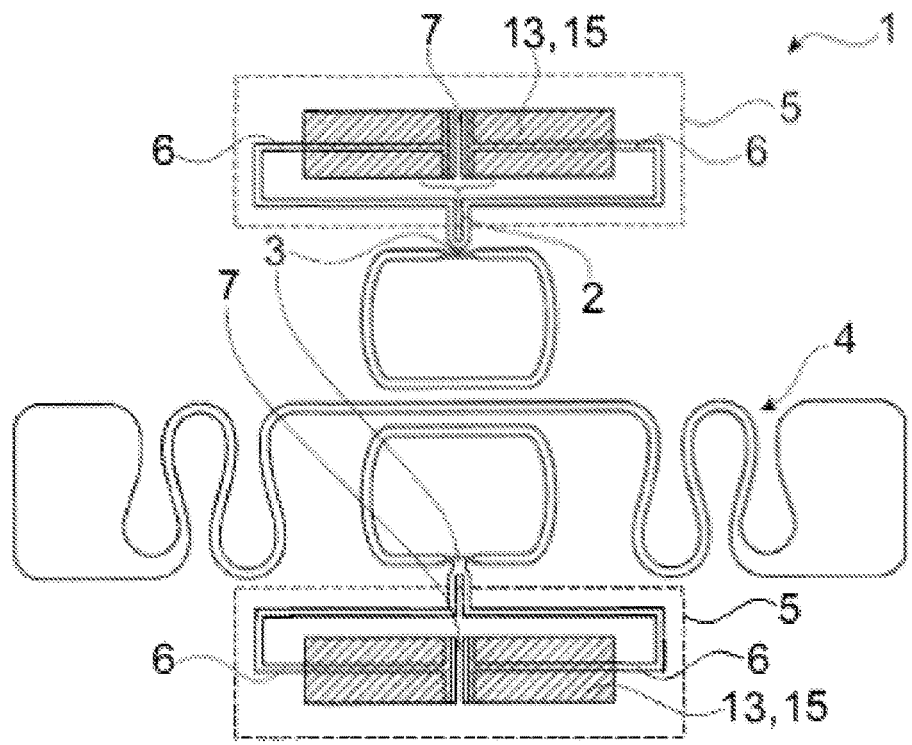
Figure 15B:
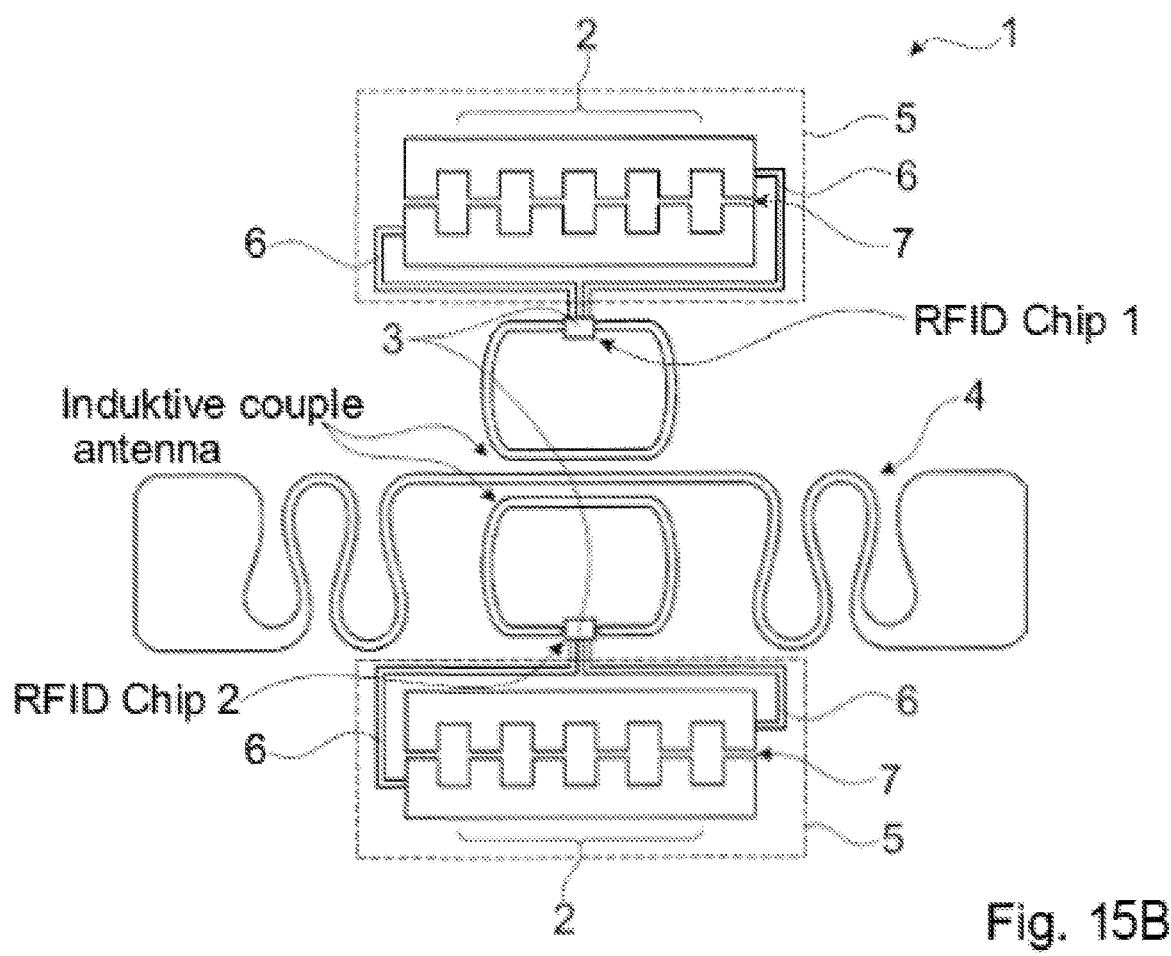

FIG. 1 Schematical drawing of the inventive threshold sensor;

FIG. 2 Schematical drawing of the sensing element comprising a conductive trace with a gap;

FIG. 3 comb or finger pattern of the conductive trace;

FIG. 4 Side-view of the inventive folded conductive trace in the sensing element in relation to the gap position;

FIG. 5 Alignment of folded lines to the gap in the conductive trace/sensing element with finger pattern;

FIG. 6 Air holes inside the conductive trace/sensing element;

FIG. 7 Threshold sensor using a temperature sensitive material as threshold indicator on the sensing element;

FIG. 8A Threshold sensor using a temperature sensitive material with a high coefficient of expansion as threshold indicator on the sensing element on both sides of the gap;

FIG. 8B Threshold sensor using a temperature sensitive material with a high coefficient of expansion as threshold indicator on the sensing element only on one side of the gap;

FIG. 9 Examples for materials with different coefficient of expansion for the use in the embodiments of FIGS. 7 and 8;

FIG. 10 Threshold sensor using moisture as threshold indicator on the sensing element;

FIG. 11 Threshold sensor using moisture as threshold indicator with a folded line along the gap between the two parts of the conductive trace of the sensing element;

FIG. 12 Schematical side-view of the folded conductive trace of FIG. 11;

FIG. 13 Threshold sensor using an absorbing material for absorbing moisture as threshold indicator on the sensing element covering the gap;

FIG. 14A Threshold sensor using a separate sensing element with a tamper loop and a RFID antenna physically connected to a separate RFID tag IC comprising a temperature threshold indicator;

FIG. 14B Threshold sensor using a separate sensing element with a tamper loop and a RFID antenna physically connected to a separate RFID tag IC comprising a moisture threshold indicator;

FIG. 15A Threshold sensor using a separate sensing element with a tamper loop and an antenna connected to a RFID tag IC comprising a temperature threshold indicator and inductively coupled to a far field RFID antenna;

FIG. 15B Threshold sensor using a separate sensing element with a tamper loop and an antenna connected to a RFID tag IC comprising a moisture threshold indicator and inductively coupled to a far field RFID antenna.

FIG. 1 shows the schematical drawing of the disclosed threshold sensor 1. The threshold sensor 1 comprises a sensing element 2 sensing a threshold resistance value by a physical property and a RFID tag comprising a tag antenna 4, a tag integrated circuit 3 and a tamper loop 5 connecting the sensing element 2 with the tag IC 3 and tracking the physical property to the tag IC 3, whereas the sensing element 2 is part of the tamper loop 5 and triggers the tag IC 3 if the threshold resistance value by the physical property has been reached.

When using the disclosed sensor as indicator for the presence of dust/dirt the RFID tag structure with the so called tamper loop 5 is directly applied to a filter medium. The accumulation of dust/dirt on the resistance sensitive structure that is part of the tamper loop 5 causes the change of status of the loop from the initial open state (no dust/dirt) to the closed state (certain amount of dust/dirt accumulated on the sensor).

The RFID tag uses a tag IC 3 that has a so called tamper loop feature. The tamper loop 5 is a track on the RFID tag connected to the IC 3. The IC 3 is capable of detecting if the loop is closed (low resistance) or is opened (high resistance). The resistance sensitive structure that is part of the tamper loop 5 is for example a metallic structure with a gap 7. With no dust or dirt on the resistance sensitive structure the resistance of that structure essentially is infinite. With the accumulation of dust/dirt on the structure, specifically on the gap 7, the resistance value changes. At a certain threshold of accumulation, the resistance of the structure will go below the value that the tag IC 3 uses to indicate an open loop, so the status of the loop changes from open to close. The IC 3 will then change the tamper bit and this can be read by reading the RFID tag with a RFID reader.

The change in resistance of the gap 7 in the tamper loop 5 due to accumulating dust/dirt will, amongst other things, depend on gap width 9 and gap length 8. These can be varied to accommodate for different threshold values. Gaps 7 in the metallic structure can be made by etching and in case very narrow or very accurate gaps are required, by laser, this is shown in FIG. 2.

The gap lengths 8 can be maximized by using so called fingers or comb 10 or other geometric structures. This is shown in FIG. 3. The conductive trace of the sensing element is structured for example by etching or laser cutting. Laser cutting will allow for very small and accurate gap widths, and more complex gap structures, in order to extend the gap length.

In order to assist the accumulation of dust/dirt on the tamper loop track, the RFID tag can be folded both along a line perpendicular or parallel to that gap 7. Dust/dirt will accumulate faster and more reliably in the fold 14 than on a flat surface and this helps to get consistent threshold results. A side-view of the inventive folded conductive trace 6 in the sensing element 2 in relation to the gap 7 position is shown in FIG. 4.

FIG. 5 shows exemplary alignments of folded lines 14 to the gap 7 in the conductive trace/sensing element 2, 10. The folding of the RFID tag is independent of the gap structure 7. When a fold is used, gaps can both be perpendicular or parallel to the fold line 14. Folding along a perpendicular line has the advantage that the gap width will not vary with folding angle. Folding along the parallel line has the advantage that the amount of dust/dirt on the gap 7 increases.

FIG. 6 shows air holes 11 that are placed in the gap structure 7 or close to the gap structure 7 in order to accumulate dust between the two parts of the conductive trace 6 of the sensing element 2. If using essentially flat materials for the sensor structure, air cannot flow through the RFID tag or sensor structure itself. This means that when the air flow is high, dust does not accumulate on the sensor structure surface, but is blown off. To help dust to accumulate on the sensor structure, air holes 11 can be cut in strategic locations of the tag of the sensing element 2. Strategic locations can be in the structure's gap 7 and/or close to it.

FIG. 7 shows an exemplary embodiment of the inventive threshold sensor 1 using a temperature sensitive material 13 as threshold indicator on the sensing element 2. The sensing element 2 comprises a conductive trace 6 with a gap 7 in it, where the distance in the gap 7 is sufficient to establish a high resistance or non-conductivity. A temperature sensitive material 13 is applied by a printing or dispensing process across the gap 7, connecting the conductor trace 6 on either side of the conductive trace 6 physically. This temperature sensitive material 13 may be a printable conductive paste, which only sufficiently hardens and becomes conductive once a specific temperature has been reached. In the initial state, the temperature sensitive material 13 has a high resistance, and the bit level of the status bit in the tag IC's internal register, which reflects the state of the digital resistive switch, hence the sensing element 2, is set to 0. As the temperatures reaches or is above the threshold temperature, the temperature sensitive material 13 changes its state and the resistance changes from high resistance to low resistance. As a result, the bit level of the status bit in the tag IC's internal register, reflecting the state of the temperature sensitive material 13 of the digital resistive switch, is set to 1. This change of the status bit in the tag IC's register from 0 to 1 can be then read from the RFID tag IC 3 via a read command from the external RFID reader which accesses to appropriate register. In this way, that the surroundings changed their temperature above a specific temperature can be detected.

The state of the material does not reverse once the change has taken place, i.e. the resistance change from high to low which results in the state change of the temperature sensitive material 13 is permanent.

In the case here, any gap 7 is sufficient, as long as the electrical resistance between the conductors on either side of the gap 7 is high. A typical gap structures 7 is shown in FIG. 2. For the purpose of this disclosure, the gap width 9 is important, as the material only need to have sufficient conductivity, in order to allow current to flow across the gap 7.

An alternative embodiment utilizes differences in the thermal expansion coefficient between materials to indicate that a specific temperature threshold has been reached. This is shown in FIG. 8. The sensing element 2 comprises a conductive trace 6 with a gap 7 in it, where the gap 7 has been generated preferably by a laser processing method, in order to generate a gap structure 7 of very small width 9. In this case, the two parts of the conductive trace 6 of the sensing element 2 on either side of the gap 7 are very close to each other, but remain electrically isolated, i.e. the resistance threshold is very high. In this initial state, the bit level of the status bit in the tag IC's internal register, which reflects the state of the digital resistive switch, is set to 0. A material is printed onto the sensing element 2, either on both sides of the gap structure 7, covering both parts of the conductive trace 6 and the substrate material under the conductive traces (FIG. 8*a*), or the material 13 is coated only on one side, covering as said both one side of the conductive trace 6 and the substrate material under the conductor structure (FIG. 8*b*). In both cases, the gap 7 area is free of material 13, i.e. this area of the sensing element 2 is not covered by material 13. The material 13 can be printed onto the sensing element 2, but it can also be brought onto the structure by dispensing. A specific property of this material 13 is that it has a very high coefficient of thermal expansion relative to the thermal expansion coefficient of the substrate material. As an example: the substrate material is PET (Polyethylenterephthalat), which has a temperature expansion coefficient of $7 \times 10^{-5}$/K. Therefore a suitable material which can be printed onto the sensing element 2 and which has a higher temperature expansion coefficient would be for example a silicone material, which has a coefficient of thermal expansion $3.25 \times 10^{-4}$/K, which is a tenfold increase compared to PET. With suitable silicone materials and appropriate locations around the gap structure in the sensing element 2, the increased expansion of the silicone material compared to the PET, will result in a the narrow gap structure being closed and the resistance level dropping from high to low as the conductor structures are no longer isolated but touch each other, i.e. the gap 7 is closed. In this state, the bit level of the status bit in the chip internal register, which reflects the state of the digital resistive switch, is set to 1. This bit value can be read by the RFID reader system and appropriately noted.

The state of the temperature sensor is reversible place i.e. the resistance change from high to low and then low to high as a function of whether the temperature is above the threshold or below the threshold.

The temperature threshold is tuned by the (a) gap width 9 and/or (b) by the dimensions of the material which has a higher coefficient of thermal expansion relative to the substrate material, in the most usual cases PET. Exemplary coefficients of expansion (CTE) of different materials are shown in FIG. 9.

FIG. 10 shows an exemplary embodiment of the inventive threshold sensor 1 using moisture as threshold indicator on the sensing element 2. The idea is to use a RFID tag with a sensing element 2 to measure the presence or absence of moisture. The sensing element 2 comprises a conductive trace 6 with a gap 7 in it, where the width 9 of the gap can be varied. With moisture accumulating in the gap 7, the resistance across the gap 7 will drop from infinite resistance to some finite low resistance value which depends on the amount of moisture in the gap 7, but also on the width 9 of the gap. In addition, ions in the moisture will improve the conductivity across the gap width 9, depending on the concentration level of the conductive ions. Below a certain resistance value, the RFID tag IC 3 will detect that the resistive digital switch, hence the conductive trace 6 has gone from open to close or 0 to 1, thereby changing the bit level of the status bit in the tag IC's internal register. This change of the status bit in the tag IC's register from 0 to 1 can be then read from the RFID tag IC 3 via a read command from the external RFID reader which accesses to appropriate register. In this way, the absence or presence of moisture can be detected.

The change in resistance of the gap is detected by the sensing element 2 due to accumulating moisture and this will depend on gap width 9 and to a lesser extent on gap length 8 (see FIG. 2). These can be varied to accommodate for different threshold values.

To assist the accumulation of moisture on the gap zone, the tag can be folded along a line 14 parallel to that gap 7. This is shown in FIG. 11. Moisture will accumulate faster and more reliably in the fold 14 than on a flat surface and this may help to get consistent threshold results.

A schematical side-view of the folded 14 conductive trace 6 of FIG. 11 is shown in FIG. 12.

FIG. 13 shows the inventive threshold sensor 1 using an absorbing material 15 for absorbing moisture as threshold indicator on the sensing element 2 covering the gap 7. The moisture may simply modify the state of an absorbing material on the applied gap 7. The moisture sensitive material 15 can be an absorbing material which can absorb moisture. This material may be a conductive paste, which only hardens and becomes conductive in the presence of moisture. In the initial state, the material has a high resistance, and the digital resistive switch is set to 0. As a result of the absorption of moisture, the material changes its state, thereby increasing its conductivity. In the final state, the material has a low resistance, and the digital resistive switch is set to 1. Alternatively, the material may have a low resistance when it is placed on the gap area, hence in its initial state but as a result of moisture ingress, loses it conductivity in its final state. So, the absorbing material can be also a material with soluble particles and be conductive in the case that no moisture is present. Due to moisture ingress, the conductive particles corrode, and lose their conductivity. With the conductivity loss, the resistance becomes high, i.e. the digital resistive switch is set to 0. But the absorbing material can also be a material with conductive particles, which is non-conductive in initial state, whereas the digital resistive switch is set to 0. The presence of moisture starts a chemical reaction in the material, leading to a reduction in volume. The conductive particles then compress to each other in the material to yield a higher conductivity i.e. a lower resistance in final state post chemical reaction compared to original state, i.e. the digital resistive switch is set to 1.

This state is permanent, i.e. when the state change has taken place, the material remains in the final state, and this can be measured even after moisture levels have reduced. The switch then detects the final state across the gap, which is unchangeable after the chemical change has taken place.

The advantage of using such a threshold sensor utilizing a moisture threshold indicator is that the sensing area of the design has a shape and area corresponding to the application but also related to the expected moisture amount and moisture ion concentration.

The gap 7 area of the threshold sensor 1 using the moisture threshold indicator is introduced to the sensing area either during the sensing area manufacture, e.g. via etching, or it is done as a separate step, by laser cutting. Laser cutting will allow for very small gap widths and more complex gap structures, which have an obvious advantage for the applications where small amounts of moisture are present or low conductivities of the moisture. The gap lengths 8 can be maximized by using so called fingers or other geometric structures 10 (see FIG. 3).

FIG. 14 shows an embodiment of the inventive threshold sensor 1 detecting two different threshold values, for each using a separate sensing element 2 with a tamper loop 5 and a RFID antenna 4 physically connected to a separate RFID tag IC 3.

FIG. 15 shows similar embodiments as in FIG. 14, whereas each conductive trace 6/gap 7/RFID tag IC 3 is connected inductively to the farfield antenna, enabling a more compact, material saving antenna design.

FIG. 14a shows the inventive threshold sensor 1 using a temperature threshold indicator. As explained above, in the simplified case, a single temperature level can be measured, depending on the gap width 9, and temperature threshold. However, in the more expanded case, several conductive trace 6 structures with individual gaps 7 with different gap widths 9 can be employed to determine two or more temperature thresholds, where the measurement is dependent only on the gap width 9, which is tuned for each specific temperature threshold of interest. In this case, each conductive trace 6 in the tamper loop 5 with a gap structure of a specific width 9 is attached to an individual, uniquely identifiable RFID tag IC 3, and upon reaching the temperature threshold, the resistive digital switch, hence the sensing element 2 will switch from 0 to 1. This can be done by using separate antenna structures in each case. Alternatively, a singular far field antenna structures can be employed, and each conductive trace 6/gap 7/RFID tag IC 3 is connected directly (FIG. 14a) or inductively (FIG. 15a) to the farfield, enabling a more compact, material saving antenna design.

FIG. 14b shows the inventive threshold sensor 1 using a moisture threshold indicator. As explained above, in the simplified case, a single moisture level can be measured, depending on the variables gap width 9, moisture level and ion concentration. However, in the more expanded case, several conductive trace 6 structures with individual gaps 7 with variable gap widths 9 can be employed to determine a moisture range, where the measurement is dependent only on the gap width 9. In this case, each conductive trace 6 with a gap 7 structure of a specific width 9 is attached to an individual, uniquely identifiable RFID IC 3, and upon moisture accumulation, the resistive digital switch, hence the sensing element 2, will switch from 0 to 1, dependent on correlating moisture level and gap width 9. This can be obviously be done by using separate antenna structures with individual RFID tag ICs 3 for each gap width 9. Alternatively, a singular far field antenna structures can be employed, and each conductive trace 6/gap 7/RFID tag IC 3 is connected directly (FIG. 14*b*) or inductively (FIG. 15*b*) to the farfield, enabling a more compact, material saving antenna design.

Finally, the moisture may simply modify the state of a secondary material on the applied gap 7. This material may be a conductive paste, which only hardens and becomes conductive in the presence of moisture. Alternatively, the material may have a low resistance when it is placed on the gap area, but as a result of moisture ingress, loses it conductivity.

The invention claimed is:

1. A threshold sensor comprising a sensing element sensing a threshold resistance value by a physical property and a RFID tag comprising a tag antenna, a tag integrated circuit and a tamper loop connecting the sensing element with the tag IC and tracking the physical property to the tag IC, whereas the sensing element is part of the tamper loop and triggers the tag IC if the threshold resistance value by the physical property has been reached.

2. Threshold sensor according to claim 1, wherein the physical property is dust or temperature or moisture.

3. Threshold sensor according to claim 1, wherein the sensing element comprises a conductive trace with a gap structure-in it, whereas the gap structure separates the conductive trace into two parts, and whereas the gap structure has a gap length and a gap width.

4. Threshold sensor according to claim 1, wherein the threshold resistance value is adjustable by the gap width and the gap length.

5. Threshold sensor according to claim 3, wherein the gap structure has a comb or finger structure for extending the gap length.

6. Threshold sensor according to claim 3, wherein the conductive trace as part of the tamper loop is folded along a line perpendicular to the gap structure.

7. Threshold sensor according to claim 3, wherein the conductive trace as part of the tamper loop is folded along a line parallel to the gap structure.

8. Threshold sensor according to claim 1, wherein air holes are placed in the gap structure or close to the gap structure in order to accumulate dust between the two parts of the conductive trace of the sensing element.

9. Threshold sensor according to claim 1, wherein the two parts of the conductive trace of the sensing element are connected physically by a sensing material over the gap structure.

10. Threshold sensor according to claim 9, wherein the sensing material is a temperature sensitive material comprising conductive particles, whereas the temperature sensitive material changes its conductive state according to a temperature threshold.

11. Threshold sensor according to claim 9, wherein the sensing material is a moisture sensitive material comprising conductive and/or soluble particles, whereas the moisture sensitive material changes its conductive state according to a moisture threshold.

12. Threshold sensor according to claim 1, wherein only one or both of the two parts of the conductive trace of the sensing element are covered by a temperature sensitive material, whereas the gap structure remains uncovered, and whereas the temperature sensitive material has a high coefficient of thermal expansion relative to the thermal expansion of a subtract material carrying the threshold sensor.

13. Threshold sensor according to claim 1, wherein the gap width and the gap length are performable by an etching process or by a laser process or by a combination of the etching and the laser process.

14. Threshold sensor according to claim 1, wherein the threshold sensor-comprises more than one sensing element each sensing a different threshold resistance value by a physical property, whereas each sensing element is connected by a tamper loop to a tag IC tracking the physical property to the tag IC, whereas each sensing element has a different gap width of the gap structure to measure different threshold resistance values.

15. Threshold measuring process using the threshold sensor according to claim 1, wherein the process comprising the following steps:
   monitoring a threshold resistance value by a physical property using an activated tag IC of a RFID tag,
   detecting if the pre-defined threshold resistance value has been reached by an zero or infinite resistance of a tamper loop as part of the RFID tag
or
   detecting if the pre-defined threshold resistance value has not been reached by an infinite or zero resistance of a tamper loop as part of the RFID tag
   using a RFID transponder.

* * * * *